Patented Nov. 12, 1935

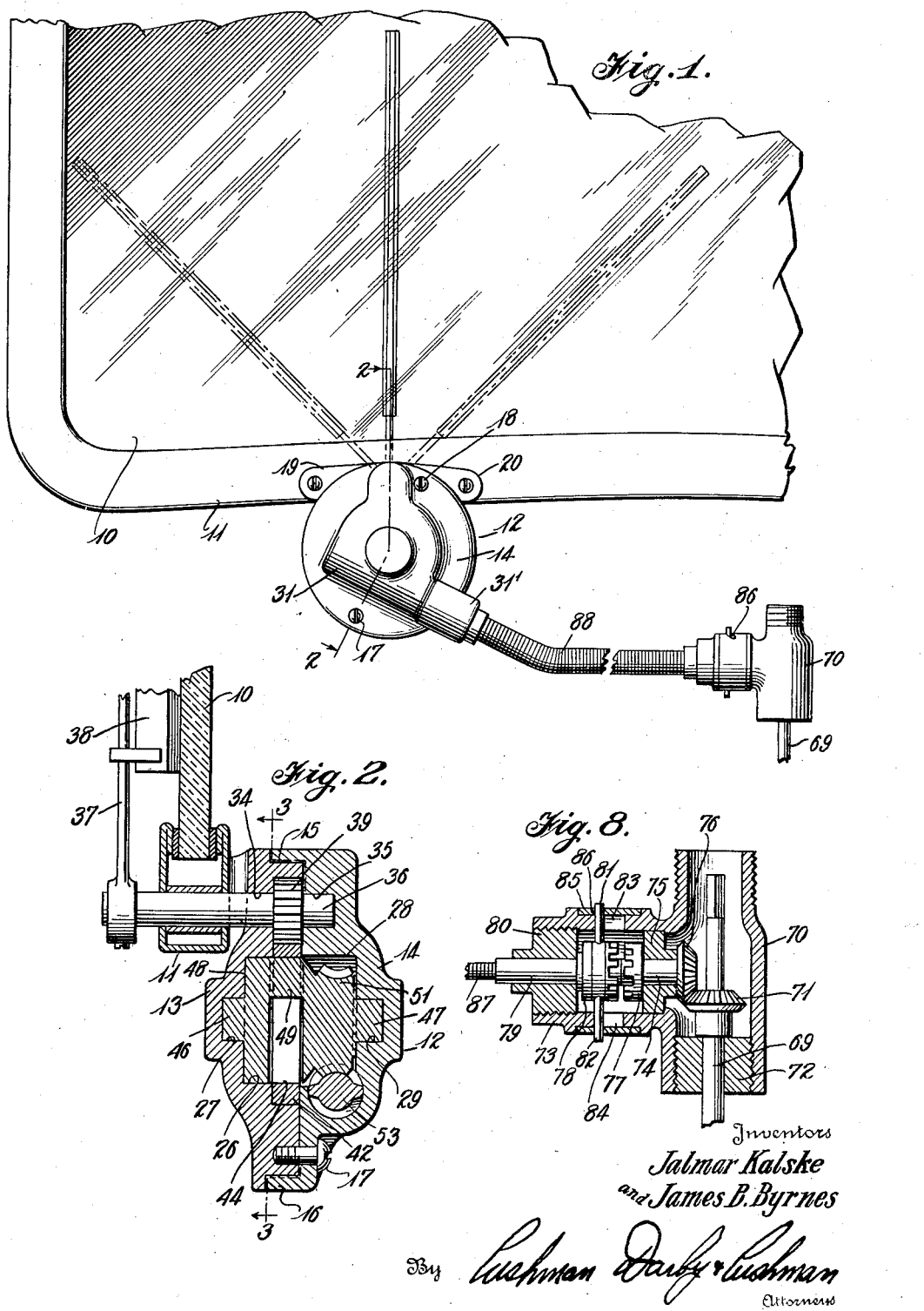

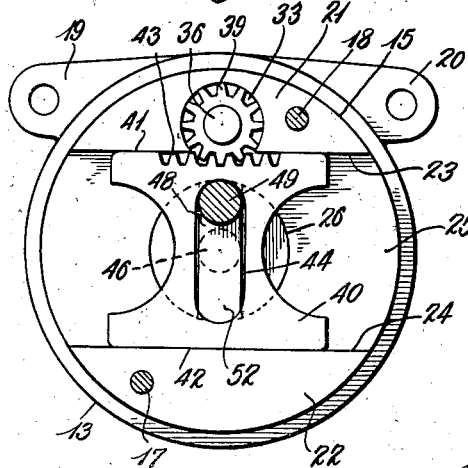
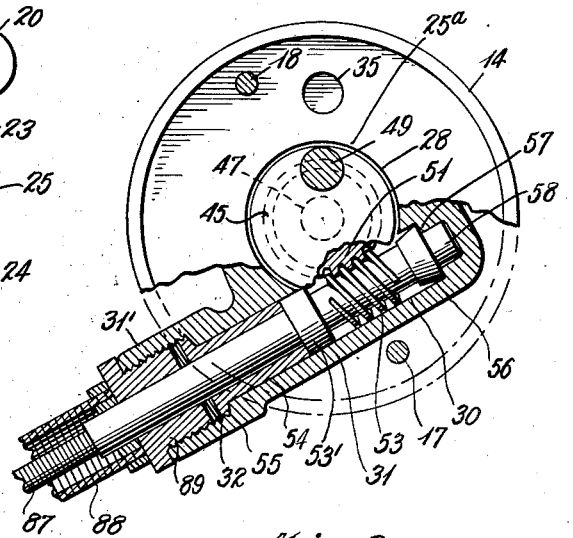

2,020,784

UNITED STATES PATENT OFFICE 2,020,784

WINDSHIELD WIPER

Jalmar Kalske and James B. Byrnes,
Butte, Mont.

Application May 8, 1935, Serial No. 20,464

9 Claims. (Cl. 74—78)

The present invention relates to windshield wipers and has as its principal purpose to provide compact and efficient means for transforming rotary drive motion into oscillatory motion of a wiper shaft. While any source of rotary power may be utilized for the drive, a desirable source is found in the usual speedometer drive shaft and we shall disclose herein, by way of example, a suitable connection with such a shaft.

An illustrative embodiment of the invention is shown in the accompanying drawings and the description will proceed with reference thereto.

In the drawings.

Figure 1 shows a portion of a windshield with the devices of the present invention in association therewith;

Figure 2 is a section substantially on the line 2—2 of Figure 1;

Figure 3 is a section substantially on the line 3—3 of Figure 2;

Figure 4 is a section substantially on the line 3—3 of Figure 2 but viewed in the opposite direction, parts also being broken away;

Figure 5 is a perspective of a reciprocating slide which appears in elevation in Figure 3;

Figure 6 is an elevation of a double crank and worm wheel constituting drive means for the slide of Figure 5;

Figure 7 is a partial sectional view of a double wiper installation; and

Figure 8 is a sectional view of a drive coupling which appears in elevation in Figure 1.

Referring to the drawings and first to Figures 1 to 6, reference numeral 10 designates the left hand portion of a windshield, looking forwardly, and reference numeral 11 a metal frame channel in which the windshield is mounted. Reference numeral 12 designates generally a housing constituting a part of the wiper operating mechanism, this housing comprising a pair of separable parts 13 and 14 of generally circular form. The part 13 has a peripheral shoulder 15 which is embraced by a cylindrical flange 16 of the portion 14, the two parts being held together by screws 17 and 18. The portion 13 has a pair of ears 19 and 30 pierced to receive screws by means of which the casing is secured to supporting structure such as frame member 11.

On its inner face, casing portion 13 has opposite segmental formations 21 and 22 which present opposed parallel guide faces 23 and 24 which extend horizontally. Between surfaces 23 and 24, the casing portion presents a plane surface 25 which is perpendicular to the surfaces 23 and 24. The outer surfaces of the segmental formations 21 and 22 constitute in part the shoulder 15, this shoulder being shallower at the ends of surface 25 as will be understood.

Centrally with respect to the annular shoulder 15, casing portion 13 is provided with a cylindrical recess 26, a blind bore 27 being formed in the bottom of recess 26 coaxially therewith. The diameter of recess 26 is preferably less than the distance between walls 23 and 24. The casing portion 14 has a cylindrical recess 28 opposite recess 26 and of about the same diameter and in the bottom wall of the same is a blind bore 29 coaxial with bore 27 and of the same diameter as the latter. A bore 30 formed in an enlargement 31 of casing portion 14 intersects recess 28 and has an enlarged internally threaded terminal portion 32 in an extension 31' of enlargement 31.

Casing portion 13 has a cylindrical recess 33 in its segmental formation 21, the surface 23 being secantal with respect to this recess. Coaxial with recess 33, casing portion 13 is pierced by a bore 34, casing portion 14 having a blind bore 35 coaxial with bore 34 and of the same size. A shaft 36 has an inner end journaled in bores 34 and 35 and an outwardly projecting portion which is passed through a suitable opening in frame member 11 and at its extremity has fixed thereon a wiper arm 37 which carries a blade 38 in operative relation to the front surface of windshield 10. Within recess 33, shaft 36 has fixed thereon a pinion 39, longitudinal displacement of shaft 36 being prevented by abutment of the ends of pinion 39 with the bottom of recess 33 and with the opposed inner face 25a of casing portion 14.

A slide 40 has parallel edges 41 and 42 in guided relation with surfaces 23 and 24 and has a thickness substantially equal to the depth of the latter. Intermediate its ends, edge 41 is provided with a series of rack teeth 43 which engage the teeth of pinion 39. The extremities of edge 41 are free of teeth and thus provide smooth surfaces of substantial size for guided sliding contact with surface 43. To reduce weight, the ends of the slide are preferably recessed in the manner shown in Figures 3 and 5. Midway between its ends, the slide is provided with a slot 44 which is in perpendicular relation to edges 41 and 42.

A double crank generally designated at 45, Figure 6, has coaxial shaft portions 46 and 47. A web portion 48 fixed to shaft portion 46 has fixed at its extremity the crank pin 49, the latter being fixed at its other end to a circular web 50 which is outwardly tapered to a worm wheel 51. Web 48 is continued on shaft portion 46 into an equal extension 52. The sides of web 48 and extension 52 are bounded by parallel planes, spaced apart a distance no greater than the width of slot 44 and no greater than the diameter of crank pin 49 and preferably tangential to the pin, the web and extension having a combined length no greater than the length of slot 44. The crank and worm wheel are preferably an integral unit.

In assembly, shaft portion 46 and web 48 and its extension 52 are inserted through slot 44 to position pin 49 in the latter. Shaft portion 46 is rotatably received in bore 27 and web 48 and its extension 52 in recess 26, the extremities of the web and extension being rounded to conform to the recess. The outer surface of the web and extension is in a plane perpendicular to the axis of the shaft portions and is adapted to bear against the end wall of recess 26, this latter wall lying in a plane perpendicular to the axis of the recess. Thrust is taken by these expanded surfaces rather than by the end of shaft portion 46 so that wear due to thrust is minimized. Extension 52 is also a balancing provision.

A worm 53 is disposed in bore 30 and is held therein by means of a sleeve 54 whose threaded head 55 is screwed into the threaded extremity 32. Screw 53 has an integral thrust collar 53' cooperating with the inner end of sleeve 54 and a thrust collar 56 coacting with an annular shoulder 57 which embraces the extremity 58 of the worm and provides bearing therefor.

With shaft 36, slide 40 and crank 45 assembled with casing part 13, the casing part 14 may be brought to position, worm wheel 51 being received in recess 28 and shaft portion 47 in bore 29, the worm wheel being operatively engaged by worm 53. The casing parts are securely held together by the screws 17 and 18. With a properly designed worm and worm wheel, the worm wheel cannot be inserted in recess 28 with the worm in the relation shown in Figure 4, this being due to interference with the worm of the ends of the arcuate worm wheel teeth. On the other hand, the worm cannot be screwed into engagement with the worm wheel with the latter in the recess in view of the thrust collar 56. For these reasons, a free space is left between the worm thread and collar 56 and, in assembly, the worm is positioned in its bore to bring this space in register with the portion of the worm wheel closest to the worm axis. The worm wheel can thus be moved into position in recess 28 and the worm then advanced to proper position. Wheel 51 has a thrust surface 51a for cooperation with the plane surface of the recess end wall.

In view of the use of the worm and worm wheel drive as just described, there will be a constant axial thrust on the crank in one direction or the other in operation, depending upon the direction in which the worm is rotated. In any event, the thrust is properly taken care of by the adequate thrust surfaces which are provided.

As crank 45 is rotated, slide 40 is reciprocated, thus oscillating shaft 36 and the windshield wiper, the action of the slide being perfectly smooth by reason of the adequate guide surfaces at its edges 41 and 42. Inasmuch as recesses 26 and 28 are of less diameter than the distance between guide walls 23 and 24, the side margins of the slide at edges 41 and 42 have a continuous cooperating guide surface provided by the surface 25 of the casing part 13 and the surface 25a of casing part 14.

In the case of a double installation, the slide 40', Figure 7, may be slightly modified to provide a portion 59 provided with a threaded bore receiving the threaded extremity of a rod 60 which is passed through a collared aperture 61 in the flange of casing portion 14', a gland being preferably provided to keep the casing tight. At its other end, rod 60 has an upward extension 62 guided for reciprocation in a housing 63 having the attachment ears 64 and 65 which may be secured to a supporting member as the windshield frame 11 at the right hand side of the latter. Housing 63 has journaled therein a wiper shaft 66 on which is fixed a pinion 67 engaged with teeth 68 in the rectilinear top edge of enlargement 62. It will be evident that upon reciprocation of slide 45 both wiper shafts 36 and 66 will be oscillated.

While the drive for the devices above described may be taken from any suitable source of rotary power, it may be conveniently taken from the speedometer drive shaft as shown in Figures 1 and 8. In these figures, reference numeral 69 designates the speedometer drive shaft whose upper end extends into a T-coupling 70 and has fixed thereon a bevel gear 71, the shaft being journaled in a plug 72. In the branch 73 of the coupling, a short shaft 74 is journaled in a plug 75 and has fixed thereto a bevel gear 76 which engages bevel gear 71. At its other end, shaft 74 has fixed thereto the drive member 77 of a jaw clutch. A driven clutch member 78 is splined on the end of a short shaft section 79 which is journaled in a plug 80. Clutch member 78 has diametrical pins 81 and 82 secured thereto and projecting through longitudinally extending slots 83 and 84 in portion 73. The latter has an annular groove in which is disposed a band 85 which has cam slots as at 86, Figure 1, in which the ends of pins 81 and 82 are engaged. By turning band 85, clutch element 78 may be reciprocated through the pins so that the clutch may be engaged or disengaged.

A flexible shaft 87 connects shaft section 79 with the shank of worm 53, Figure 4, shaft 87 being enclosed in a flexible conduit 88 which has a coupling nut 89 threaded in recess 32. The position of the worm is such that the flexible shaft 87 may be readily connected thereto. The drive for the speedometer is taken from the upper end of shaft 69.

It will be seen from the above that we have provided a very compact wiper actuating mechanism and while the reciprocating range of slide 40 is small, the use of the relatively small pinion 39 assures an adequate range of oscillation for the wiper. We prefer to take the drive from the speedometer shaft, since this power is at hand and is positive. It will be understood, however, that the disclosure herein is merely illustrative and not restrictive of the invention and that we do not limit ourselves except as in the following claims.

We claim:—

1. In a windshield wiper, a casing provided with coaxial bores, a circular countersink in the casing coaxial with one of said bores, means providing parallel guide surfaces in said casing, a slide having rack teeth on at least one side thereof mounted between said surfaces, the said slide being provided with a slot, a crank mounted in said casing; the said crank including a shaft having ends mounted in said bores, a pin, and a web adjacent one end of said shaft of a shape to be passed through said slot to position said pin operatively in the latter and to position said web in said countersink; a blade-carrying shaft journaled in said casing, and a pinion on said last-named shaft meshing with said rack teeth, whereby upon rotation of said crank the said slide is reciprocated and said blade carrying shaft oscillated.

2. In a windshield wiper, a casing having opposite separable wall portions, a blade carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear which is of a size to pass through said slot to position the pin in the latter, and a rotatable element journaled in said casing and engaging said gear to drive the same and thereby reciprocate said slide through said crank.

3. In a windshield wiper, a casing having opposite separable wall portions, a blade-carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear, said web portion being confined between parallel planes tangential to said pin and said slot being of a width just sufficient so that the web may be passed therethrough to position the pin operatively therein, and a rotatable element journaled in said casing and engaging said gear to drive the same and thereby reciprocate said slide through said crank.

4. In a windshield wiper, a casing having opposite separable wall portions, a blade-carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear which is of a size to pass through said slot to position the pin in the latter, said web having an outer surface in a plane perpendicular to the axis of said shaft portions and the adjacent casing portion providing a plane thrust surface for engagement by said outer surface, and a rotatable element journaled in said casing and engaging said gear to drive the same and thereby reciprocate said slide through said crank.

5. In a windshield wiper, a casing having opposite separable wall portions, a blade-carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear, said web having a radial extension beyond its associated shaft portion and the web and extension having an outer surface in a plane perpendicular to the axis of said shaft portions, the adjacent casing portion providing a plane thrust surface for engagement by said outer surface, said web and extension being of a size to be passed through said slot to position the pin in the latter, and a rotatable element journaled in said casing and engaging said gear to drive the same and thereby reciprocate said slide through said crank.

6. In a windshield wiper, a casing having opposite separable wall portions, a blade-carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear which is of a size to pass through said slot to position the pin in the latter, said web and wheel being disposed in recesses formed in the respective wall portions, which recesses are of less dimension transversely of said guide surfaces than the distance between said guide surfaces so that the inner faces of said wall portions provide continuous guide surfaces for the side margins of said slide adjacent the edges of the latter, and a rotatable element journaled in said casing and engaging said gear to drive the same and thereby reciprocate said slide through said crank.

7. In a windshield wiper, a casing having opposite separable wall portions, a blade-carrying shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said one of said sides having end portions free of teeth and providing adequate wear surfaces, said slide being provided with a slot, a crank having a shaft with end portions rotatable in bores provided in said wall portions and having a crank pin in said slot, a gear fixed on said crank shaft adjacent one of said end portions, the crank including a web portion at the opposite end of the pin from said gear which is of a size to pass through said slot to position the pin in the latter, and a rotatable element journaled in said casing and engaging said gear to drive the same and thereby reciprocate said slide through said crank.

8. In a windshield wiper, a casing having opposite separable wall portions, a shaft journaled in and projecting inwardly and outwardly of one of said wall portions, a pinion fixed on the inwardly projecting portion of said shaft, means defining parallel guide surfaces within said casing, one of said surfaces intersecting the periphery of said pinion, a reciprocable slide having parallel sides guided between said surfaces, one of said sides being provided with rack teeth engaging said pinion whereby to oscillate the latter and therewith said shaft, said slide being provided with a slot, a double crank having a shaft with end portions rotatable in bores provided in said wall portions and having a crank pin in said slot, a worm wheel fixed on said crank shaft adjacent one of said end portions, the crank including a web portion at the opposite end of the pin from said wheel which is of a size to pass through said slot to position the pin in the latter, and a worm journaled in one of said casing portions and engaging the worm wheel to drive the same and thereby reciprocate the slide through said crank.

9. In a windshield wiper, a casing having opposite separable wall portions, one of said portions having a parallel walled recess on its inner side, a reciprocable slide guided in said recess and having a toothed side, a blade-carrying shaft journaled in said one of said wall portions and projecting inwardly and outwardly thereof, a pinion fixed on the inner end of said shaft and engaging the slide teeth, the pinion and therewith the shaft being oscillated upon reciprocation of the slide, said slide being provided with a slot, a crank journaled in bores provided in said casing portions and having a pin engaged in said slot, a worm wheel in the casing for driving the crank, and a worm journaled in the other casing portion and engaging said worm wheel to drive the same, said casing portions having inner circular recesses surrounding said bores, said worm being received in one of said recesses and the crank including a web received in the other of said recesses.

JALMAR KALSKE.
JAMES B. BYRNES.